(12) United States Patent
Kimura

(10) Patent No.: US 12,711,580 B2
(45) Date of Patent: Aug. 18, 2026

(54) IMAGE PROCESSING METHOD, IMAGE PROCESSING APPARATUS, LEARNING APPARATUS, MANUFACTURING METHOD OF LEARNED MODEL, AND STORAGE MEDIUM

(71) Applicant: CANON KABUSHIKI KAISHA, Tokyo (JP)

(72) Inventor: Yoshinori Kimura, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 395 days.

(21) Appl. No.: 18/345,968

(22) Filed: Jun. 30, 2023

(65) Prior Publication Data

US 2024/0013362 A1 Jan. 11, 2024

(30) Foreign Application Priority Data

Jul. 5, 2022 (JP) ................................ 2022-108573

(51) Int. Cl.

| | |
|---|---|
| ***G06T 5/50*** | (2006.01) |
| ***G06T 3/4007*** | (2024.01) |
| ***G06T 7/174*** | (2017.01) |
| ***H04N 23/84*** | (2023.01) |

(52) U.S. Cl.

CPC .............. *G06T 5/50* (2013.01); *G06T 3/4007* (2013.01); *G06T 7/174* (2017.01); *H04N 23/84* (2023.01); *G06T 2207/10024* (2013.01); *G06T 2207/20021* (2013.01); *G06T 2207/20081* (2013.01); *G06T 2207/20084* (2013.01)

(58) Field of Classification Search

CPC ......... G06T 5/50; G06T 3/4007; G06T 7/174; G06T 2207/10024; G06T 2207/20021; G06T 2207/20081; G06T 2207/20084; G06T 3/4053; G06T 3/4046; G06T 7/10; G06T 7/90; H04N 23/84; G06N 3/0464; G06N 3/08

See application file for complete search history.

(56) References Cited

U.S. PATENT DOCUMENTS

2023/0343063 A1* 10/2023 Xu .......................... G06T 7/194

FOREIGN PATENT DOCUMENTS

| | | | | |
|---|---|---|---|---|
| CN | 109196855 A | * 1/2019 | | H04N 23/67 |
| CN | 110648375 A | * 1/2020 | | G06T 11/001 |
| EP | 3706042 A1 | 9/2020 | | |
| JP | 2010073074 A | 4/2010 | | |
| JP | 2019175107 A | 10/2019 | | |

(Continued)

OTHER PUBLICATIONS

Yang. et al.,"Coupled Dictionary Training for Image Super-Resolution", pub. Aug. 2012 , vol. 21, No. 8, IEEE (Year: 2012).*

(Continued)

*Primary Examiner* — Mekonen T Bekele

(74) *Attorney, Agent, or Firm* — Canon U.S.A., Inc. IP Division

(57) ABSTRACT

An image processing method includes generating, by dividing a first grayscale image, a plurality of second grayscale images where each has less number of pixels than that of the first grayscale image, and generating a plurality of third grayscale images upscaled by inputting the plurality of second grayscale images to a machine learning model.

17 Claims, 11 Drawing Sheets

(56) References Cited

FOREIGN PATENT DOCUMENTS

| | | | |
|---|---|---|---|
| JP | 2020102012 | A | 7/2020 |
| JP | 2021090129 | A | 6/2021 |
| WO | 2019043525 | A | 3/2019 |
| WO | 2020166596 | A | 8/2020 |

OTHER PUBLICATIONS

Sood, R., et al., "An Application of Generative Adversarial Networks for Super Resolution Medical Imaging," Dec. 19, 2019.
Yang, J., "Couple Dictionary Training for Image Super-resolution," IEEE Transactions on Image Processing, Mar. 13, 2012.
Aquilina, M., et al., "Improving Super-Resolution Performance using Meta-Attention Layers," IEEE Signal Processing Letters, 2021.

* cited by examiner 10
14
LOSS
13
30
CN
CN
SC
CN
CN
SC
RB
CN
CN
SC
PS
CN
12
11

20
21
22
23
27
30
CNN
24
25
26

200

IMAGE PROCESSING METHOD, IMAGE PROCESSING APPARATUS, LEARNING APPARATUS, MANUFACTURING METHOD OF LEARNED MODEL, AND STORAGE MEDIUM

BACKGROUND OF THE INVENTION

Field of the Invention

The present invention relates to image processing that uses a machine learning model.

Description of the Related Art

Japanese Patent Application Laid-Open No. 2019-175107 discusses an image processing method that identifies the feature of a color image by converting a color image represented in an RGB color space into a color image represented in a YUV color space, and inputting information regarding high-frequency components of a resultant Y image (luminance image) to a machine learning model. In the image processing method discussed in Japanese Patent Application Laid-Open No. 2019-175107, a convolutional neural network (CNN) that generates an output image by convolving a filter to an input image a number of times is used as a machine learning model.

In the image processing method discussed in Japanese Patent Application Laid-Open No. 2019-175107, a calculation amount in the CNN is reduced and speed-up of processing is achieved by using a down-sampled luminance image as an input image.

In Japanese Patent Application Laid-Open No. 2019-175107, however, an input image is a down-sampled luminance image, and the resolution of the input image is lower than that of the luminance image. It may be accordingly difficult to obtain a high-resolution output image with the image processing method discussed in Japanese Patent Application Laid-Open No. 2019-175107.

SUMMARY OF THE INVENTION

In view of the foregoing, the present invention is directed to obtaining a high-resolution output image with image processing that uses a machine learning model.

According to an aspect of the present invention, an image processing method includes generating, by dividing a first grayscale image, a plurality of second grayscale images each including a number of pixels smaller than a number of pixels of the first grayscale image. The image processing method further includes generating a plurality of third grayscale images upscaled by inputting the plurality of second grayscale images to a machine learning model.

Further features of the present invention will become apparent from the following description of exemplary embodiments with reference to the attached drawings.

DESCRIPTION OF THE EMBODIMENTS

Figure 1:
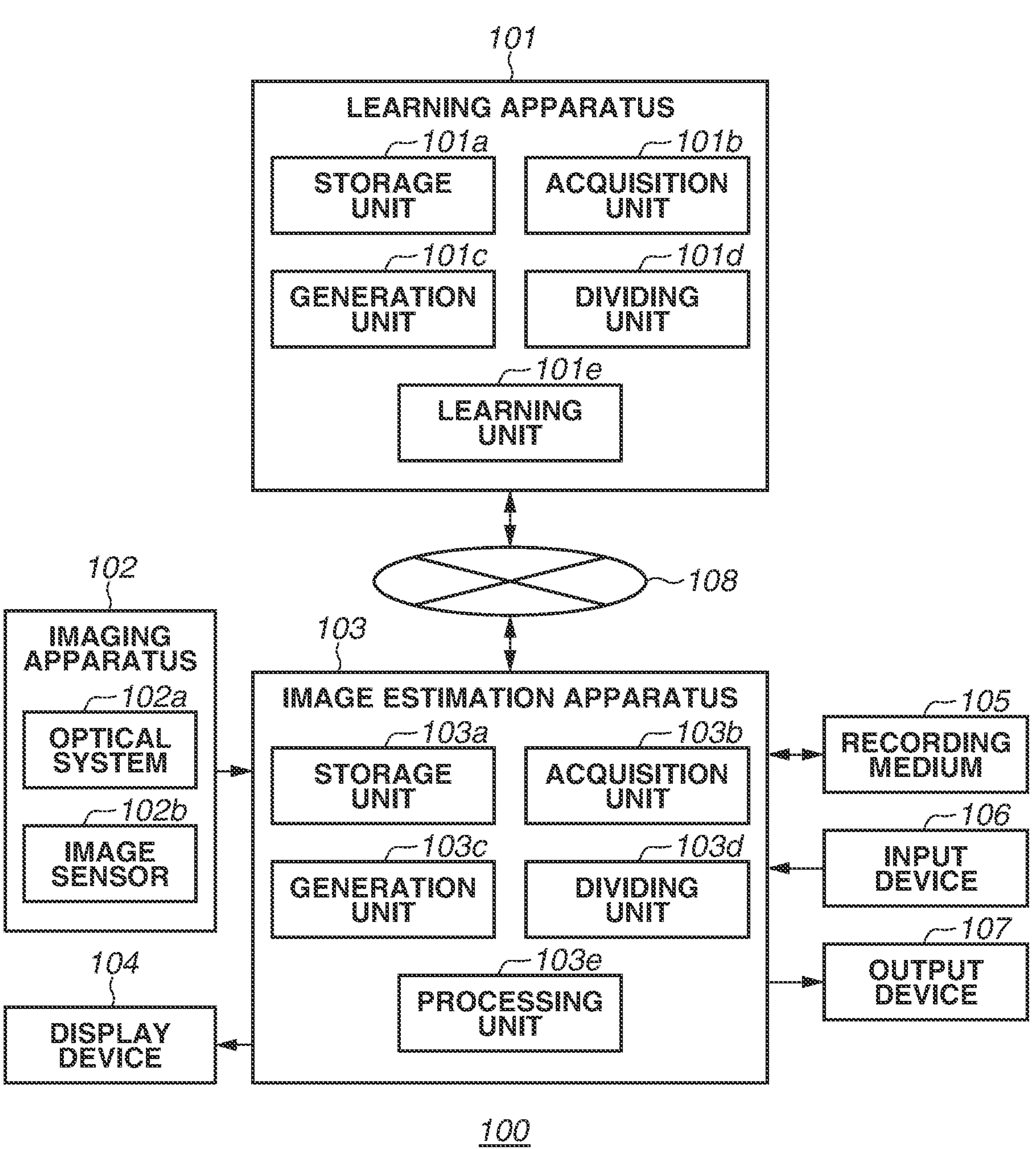
FIG. 1 is a block diagram of an image processing system according to a first exemplary embodiment.

Some exemplary embodiments of the present invention will be described in detail below with reference to the accompanying drawings. In the following drawings, the same members are assigned the same reference numerals, and the redundant description will be omitted.

Before specifically describing the exemplary embodiments, the summary of the present exemplary embodiment will be described. In the present exemplary embodiment, a machine learning model is used to upscale a luminance image (grayscale image). In the present exemplary embodiment, image processing of performing enlargement and resolution enhancement of an image will be referred to as upscaling. The machine learning model in the present exemplary embodiment is generated by performing learning (or training) a neural network. The neural network comprises a filter that performs a convolution on an image, a bias to be added to the image, and an activating function for performing nonlinear conversion. The filter and the bias are called weights all together and learned (or updated) by using a training image and a corresponding ground truth image. In the present exemplary embodiment, the learning of a machine learning model is performed by using images represented in the grayscale, as training images and ground truth images.

An image processing method in the present exemplary embodiment includes a step of generating, by dividing a first grayscale image, a plurality of second grayscale images where each image has less number of pixels than that of the first grayscale image. The image processing method further includes an estimation (or inference) step for generating a plurality of upscaled third grayscale images by inputting the plurality of second grayscale images to a machine learning model.

In the present exemplary embodiment, an input image to a machine learning model is a grayscale image down-sized from an original grayscale image by reversibly dividing the original grayscale image. When an input image is generated from a grayscale image, an original grayscale image can be reversibly down-sized by dividing the original grayscale image into a plurality of grayscale images. It is accordingly possible to reduce loss of information that is caused by down-sizing. A highly-accurate estimated image (output image) can therefore be obtained. Because an input image is an image obtained by down-sizing a grayscale image with less information amount (less number of channels) than that of a color image, it is possible to reduce calculation amount in image processing and lead to speed up the image processing, which also serves as one of features of the present exemplary embodiment.

The above-described image processing method is one example, and the present invention is not limited to this. The details of other image processing methods will be described in the following exemplary embodiments.

An image processing system 100 according to a first exemplary embodiment of the present invention will be described. In the present exemplary embodiment, the image processing system 100 learns and executes image processing of upscaling an image using a machine learning model.

Figure 2:
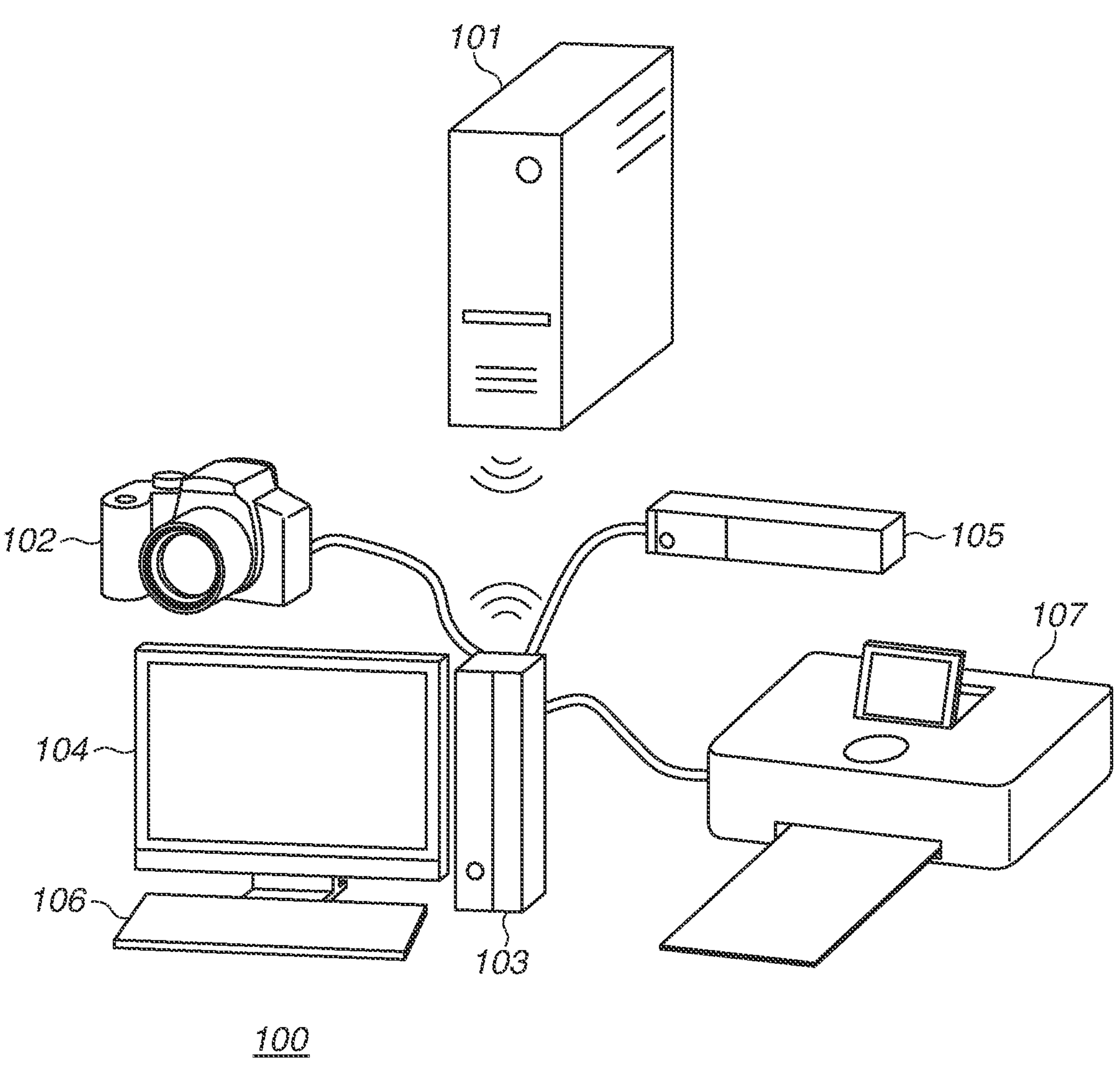
FIG. 2 is an appearance of the image processing system according to the first exemplary embodiment.

FIG. 1 is a block diagram of the image processing system 100 according to the present exemplary embodiment. FIG. 2 illustrates an appearance of the image processing system 100. The image processing system 100 includes a learning apparatus 101, an imaging apparatus 102, an image estimation apparatus 103, a display device 104, a recording medium 105, an input device 106, an output device 107, and a network 108.

The learning apparatus 101 includes a storage unit (storage means) 101*a*, an acquisition unit (acquisition means) 101*b*, a generation unit (generation means) 101*c*, a dividing unit (dividing means) 101*d*, and a learning unit (learning means) 101*e*.

The imaging apparatus 102 includes an optical system 102*a* and an image sensor 102*b*. The optical system 102*a* collects light incident on the imaging apparatus 102 from a subject space. The image sensor 102*b* receives an optical image of a subject that has been formed via the optical system 102*a* to acquire a captured image 20. The image sensor 102*b* is a charge coupled device (CCD) sensor or a complementary metal-oxide semiconductor (CMOS) sensor.

The imaging apparatus 102 transmits the obtained image to an acquisition unit 103*b* of the image estimation apparatus (image processing apparatus) 103, which will be described below. As necessary, the imaging apparatus 102 can transmit an image capturing condition corresponding to the captured image 20, together with the captured image 20. The image capturing condition is a condition of image capturing that is to be used when the captured image 20 is acquired using the optical system 102*a* and the image sensor 102*b*. For example, the image capturing condition includes a pixel pitch of the image sensor 102*b*, the type of an optical low-pass filter of the optical system 102*a*, and an ISO sensitivity. Alternatively, the image capturing condition can be a condition of development that is to be used when the captured image 20 is acquired from an undeveloped RAW image in the imaging apparatus 102. For example, the image capturing condition includes noise removal strength, sharpness strength, and an image compression ratio. In the present exemplary embodiment, development is processing of converting a RAW image into an image file in a Joint Photographic Experts Group (JPEG) format or a Tag Image File Format (TIFF).

Components that are not illustrated include a storage unit for storing images acquired in the imaging apparatus 102, a display unit for displaying the acquired images, a transmission unit for transmitting the acquired images to the outside, an output unit for causing the acquired images to be stored into an external storage medium, and a control unit for controlling each component of the imaging apparatus 102.

The image estimation apparatus 103 includes a storage unit (storage means) 103*a*, the acquisition unit (acquisition means) 103*b*, a generation unit (generation means) 103*c*, a dividing unit (dividing means) 103*d*, and a processing unit (estimation means) 103*e*. The image estimation apparatus 103 generates an output image by performing image processing on the acquired captured image 20.

The acquisition unit 103*b* acquires the captured image 20. As necessary, the acquisition unit 103*b* may acquire (receive) an image capturing condition corresponding to the captured image 20, together with the captured image 20.

The generation unit 103*c* extracts a Y image (luminance image) and a plurality of chrominance images (first chrominance images) by performing YUV conversion on the acquired captured image 20. The luminance image is a grayscale image in which information regarding a luminance value is represented only by single-color shading. The chrominance images are images respectively including information regarding U and information regarding V that are obtained after YUV conversion. The details of YUV conversion will be described below.

The dividing unit 103*d* down-sizes the luminance image by dividing (transforming) the obtained luminance image.

The processing unit 103*e* generates an estimated image (output image) by performing image processing of enlarging and enhancing resolution of the down-sized luminance image (input image). The processing unit 103*e* can perform image processing using an image capturing condition acquired by the acquisition unit 103*b*. For example, it is possible to perform image processing even on images where ground truth images corresponding to training images are acquired by arbitrary different imaging apparatuses, by using a pixel pitch of an image sensor, the type of an optical low-pass filter, and an image compression rate in addition to an input image at the time of learning of a machine learning model. The details of image processing that uses an image capturing condition will be described below. The captured image 20 can be an image captured by the imaging apparatus 102, or can be an image stored in the recording medium 105. Furthermore, an image originally represented in the grayscale, such as an infrared image or a distance image, can be used for the captured image 20.

The image processing in the present exemplary embodiment uses a neural network. Information regarding a weight in the neural network is learned by the learning apparatus 101. The image estimation apparatus 103 reads out information regarding a weight from the storage unit 101*a* via the network 108, and stores the information into the storage unit 103*a*. Information regarding a weight that is to be stored can be a numerical value of the weight, or can be an encoded weight. The details of learning of weights and image processing that uses weights will be described below. The image estimation apparatus 103 has functions of performing development processing and other types of image processing as necessary.

An output image is output to at least one of the display device 104, the recording medium 105, and the output device 107. The display device 104 is a liquid crystal display or a projector, for example. A user can check an image being processed, via the display device 104, and perform an image edit work via the input device 106. The recording medium 105 is a semiconductor memory, a hard disk, or a server on a network, for example. The input device 106 includes a keyboard and a mouse, for example. The output device 107 is a printer, for example. The image estimation apparatus 103 can display or output an image having been subjected to coloring processing. The coloring processing will be described below.

Figure 3:
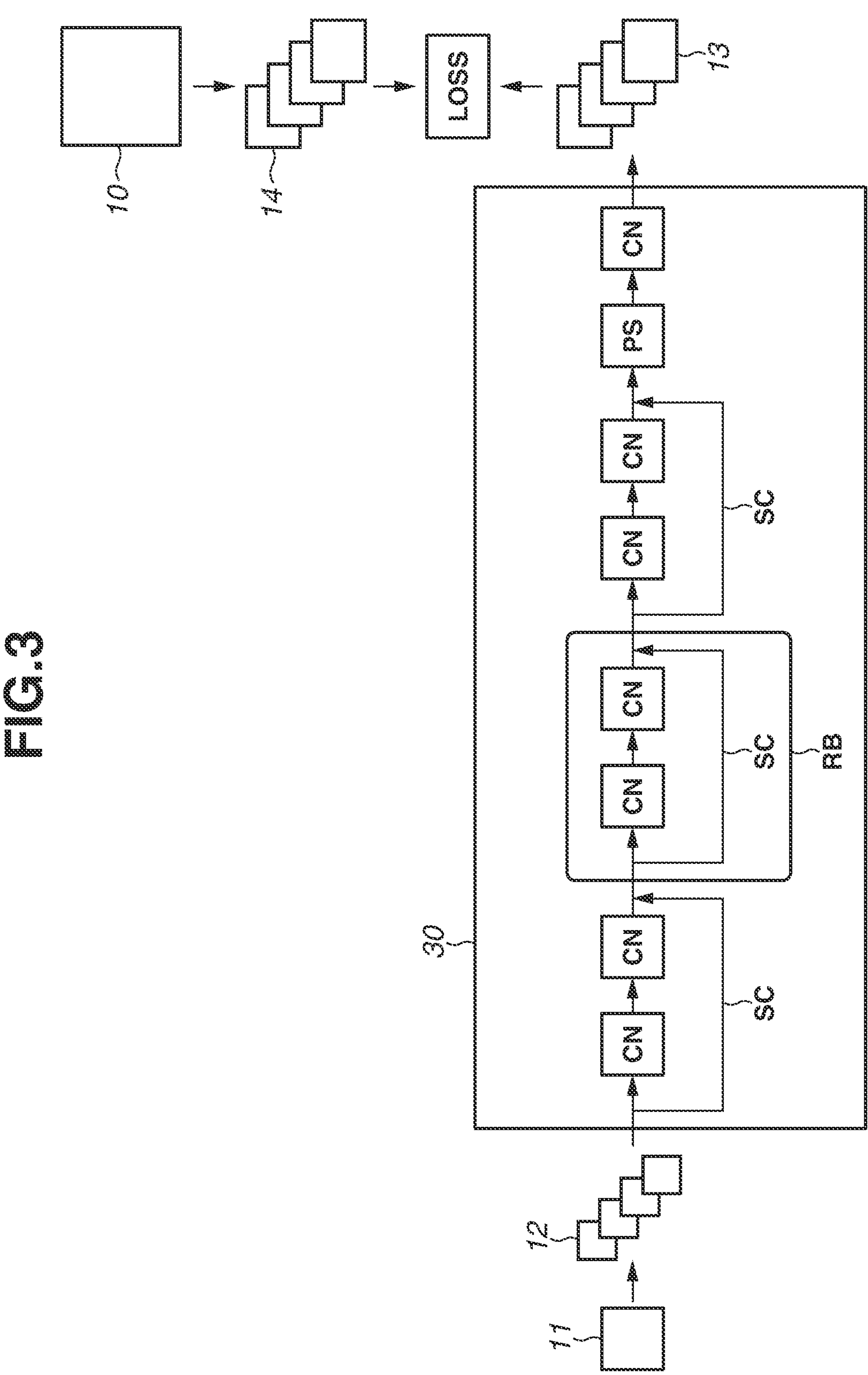
FIG. 3 is a conceptual diagram illustrating a learning method of a weight of a neural network according to the first exemplary embodiment.
Figure 4:
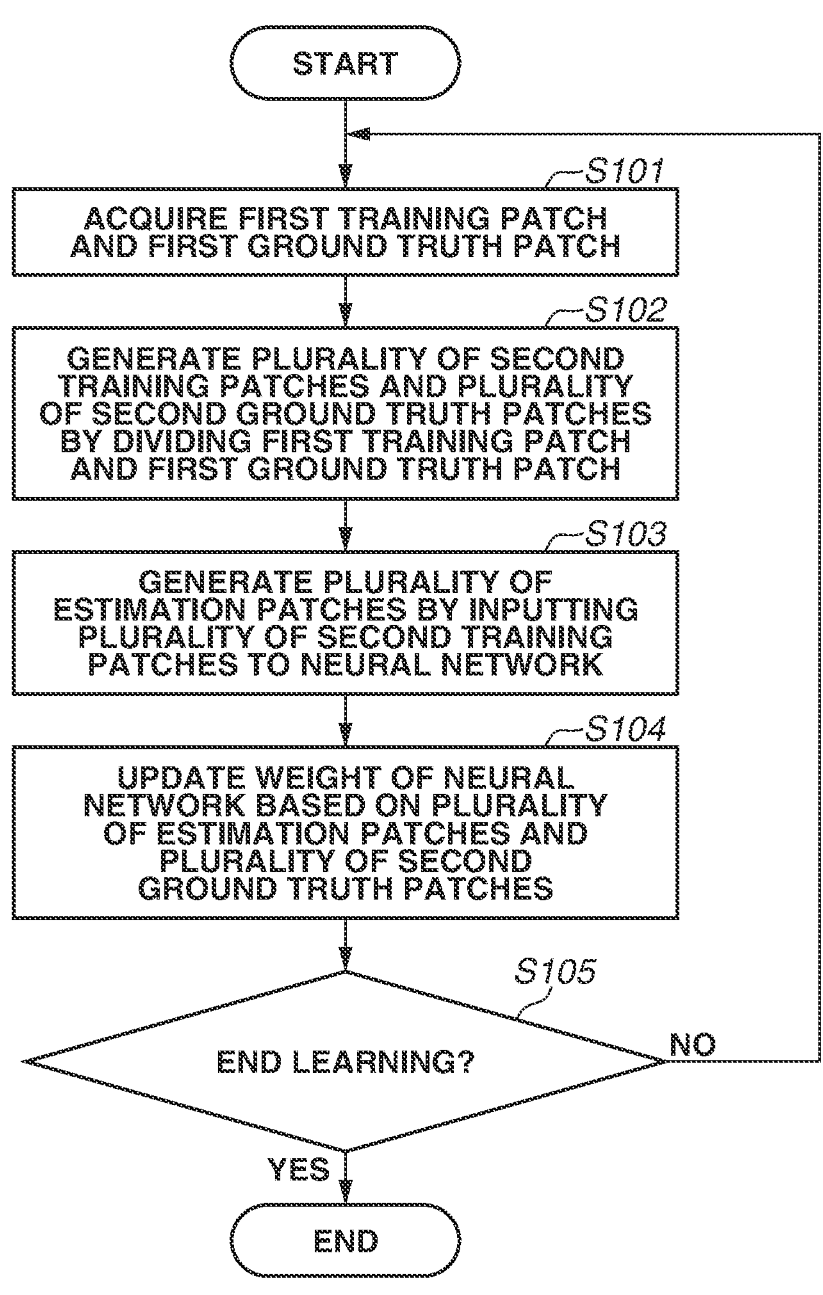
FIG. 4 is a flowchart illustrating learning processing of a weight of a neural network according to the first exemplary embodiment.

A weight learning method (manufacturing method of a learned model) to be executed by the learning apparatus 101 according to the present exemplary embodiment will be described with reference to FIGS. 3 and 4. FIG. 3 is a conceptual diagram illustrating learning (update) of a weight of a neural network. FIG. 4 is a flowchart illustrating learning processing of a neural network. In the present exemplary embodiment, a convolutional neural network (CNN) 30 is used as a neural network. The present exemplary embodiment is not limited to this. For example, a recurrent neural network (RNN) can be used.

In the present exemplary embodiment, the learning (update) of a weight of the CNN 30 is performed using mini-batch learning. In the mini-batch learning, a weight is updated by obtaining errors between a plurality of ground truth images and corresponding estimated images. For example, an L2 norm or an L1 norm can be used as an error function (loss function). Nevertheless, the exemplary embodiment is not limited to this, and online learning or batch learning can also be used.

A convolution layer CN performs a calculation of convolving a filter to information input to the CNN 30, and calculates a sum of the input information and a bias. Furthermore, the convolution layer CN performs nonlinear conversion of the obtained calculation result based on an activating function. Each component of the filters and an initial value of the bias are arbitrarily set, and determined based on random numbers in the present exemplary embodiment. As the activating function, for example, a rectified linear unit (ReLU) or a sigmoid function can be used. Each convolution layer CN excluding a final layer outputs a feature map. In the present exemplary embodiment, the feature map has a four-dimensional array having dimensions in batch, longitudinal, traverse, and channel directions.

A skip connection SC synthesizes feature maps output from noncontiguous layers. In the present exemplary embodiment, feature maps are synthesized using a method of obtaining a sum for each element. Feature maps can be synthesized by being concatenated in the channel direction.

A pixel shuffle PS is a method of enlarging a feature map. In the present exemplary embodiment, by enlarging a low-resolution feature map in a layer close to an output layer, the feature map is turned into a high-resolution feature map. For example, deconvolution or transposed convolution can be used in the enlargement of a feature map.

A residual block RB is an element (block or module) consists of a plurality of convolution layers CN. To perform more accurate learning, learning can be performed using a network called a residual network, in which residual blocks are multilayered. In the present exemplary embodiment, the residual network is used, but not limited to this. For example, a network can be multilayered using elements, such as inception modules or dense blocks.

Processing load can be reduced by down-sizing a feature map in a layer close to an input layer, enlarging (up-sizing) a feature map in a layer close to an output layer, and reducing a size of a feature map in an intermediate layer, in the convolution layer CN as necessary. Pooling or stride can be used in the reduction of a feature map. Deconvolution or transposed convolution, pixel shuffle, or interpolation can be used in the enlargement of a feature map.

A flowchart illustrating learning processing of a neural network will now be described. Each step in FIG. 4 is mainly executed by the acquisition unit 101*b*, the generation unit 101*c*, the dividing unit 101*d*, and the learning unit 101*e*.

In step S101 (acquisition step), the acquisition unit 101*b* acquires a first ground truth patch 10 (first ground truth image) and a corresponding first training patch 11 (first training image). The first ground truth patch 10 and the first training patch 11 are grayscale images at least including luminance information. In the present exemplary embodiment, the first ground truth patch 10 has a larger image size and a higher resolution as compared with those of the first training patch 11, and includes the same subject as that in the corresponding first training patch 11. A patch is an image which has a predetermined number of pixels. For example, the first training patch 11 has 128×128×1 pixels, and the corresponding first ground truth patch 10 has 256×256×1 pixels. A magnification ratio of a patch is not limited to 200% in longitudinal and traverse directions, and can be any magnification ratio as long as the first training patch 11 and the corresponding first ground truth patch 10 can be acquired. In the present exemplary embodiment, the first training patch 11 and the corresponding first ground truth patch 10 are generated by numerical calculation. However, the present invention is not limited to this. For example, the first training patch 11 and the corresponding first ground truth patch 10 can be acquired by capturing images of the same subject using optical systems with different focal lengths, and extracting corresponding portions in the obtained two images. Alternatively, the first training patch 11 can be generated by lowering the resolution of the first ground truth patch 10 by down-sampling. Furthermore, luminance patches (grayscale images) obtained by performing YUV conversion of color patches can be used as the first ground truth patch 10 and the first training patch 11. By performing YUV conversion of color patches, a luminance patch and a plurality of chrominance patches can be generated. The luminance patch and the plurality of chrominance patches are generated from color patches in accordance with the following formulas (1). Nevertheless, the present exemplary embodiment is not limited to these, and other definitional formulas can be used.

$$Y=0.299R+0.587G+0.114B$$

$$U=-0.14713R-0.28886G+0.436B$$

$$V=0.615R-0.54199G-0.10001B \quad (1)$$

Formulas (1) are formulas to be used in conversion from an RGB color space into a YUV color space. The RGB color space is represented using three color channels corresponding to red, green, and blue. On the other hand, the YUV color space is represented using a luminance channel (Y) and two chrominance channels (U and V).

In the present exemplary embodiment, the acquisition unit 101*b* acquires the first ground truth patch 10 and the corresponding first training patch 11 that are represented in the grayscale, but the acquisition unit 101*b* can acquire a ground truth color patch and a corresponding training color patch each including a plurality of color channels. In this case, the generation unit 101*c* generates the first ground truth patch 10 and the first training patch 11 from the ground truth color patch and the training color patch in accordance with formulas (1). Only either one of the first ground truth patch 10 and the first training patch 11 can be generated from a color patch, and the other one can be acquired by the acquisition unit 101*b* as a luminance patch.

In step S102 (division step), the dividing unit 101*d* generates a plurality of second training patches 12 (second training images) by dividing the first training patch 11.

The plurality of second training patches 12 is generated by reversible transformation in which information is not lost by division. In the present exemplary embodiment, the second training patches 12 are generated by arranging, in space directions (longitudinal and traverse directions), pixel values alternately extracted both in the longitudinal direction and the traverse direction of the first training patch 11. At this time, four second training patches 12 in a channel (depth) direction can be generated from one first training patch 11 in the channel direction. Each of the second training patches 12 has longitudinal and traverse sizes at least one of which is smaller, and has a lower resolution as compared with those of the corresponding first training patch 11. Furthermore, because the second training patches 12 are reversibly transformed, the sum of the numbers of pixels of the plurality of second training patches 12 is equal to the number of pixels of the first training patch 11.

In the present exemplary embodiment, the first training patch 11 is equally divided into four second training patches 12 each of which has the same number of pixels. However, a patch generation method is not limited to this. It is sufficient that at least the first training patch 11 is reversibly transformed into a plurality of second training patches 12. For example, a plurality of second training patches 12 can include different numbers of pixels. Not four but an arbitrary plural number of second training patches 12 can be generated. Furthermore, a frequency component obtained by performing multiresolution analysis by discrete wavelet transform can also be used.

By reversibly transforming the first training patch 11 represented in the grayscale, and using a plurality of second training patches 12 down-sized in the space directions, as input images to the CNN 30 in this manner, it is possible to reduce a calculation amount in the CNN 30. Furthermore, because information is not lost in a plurality of second training patches 12 by the division of the first training patch 11, it is possible to perform image processing highly accurately.

In step S102, the dividing unit 101*d* generates a plurality of second ground truth patches 14 (second ground truth images) by dividing the first ground truth patch 10 similarly to the first training patch 11. In the case of the dividing unit 101*d* inputs an image capturing condition to the CNN 30 together with the plurality of second training patches 12, the dividing unit 101*d* can convert the first ground truth patch 10 into images (maps) including image capturing conditions of the respective pixels, based on an image capturing condition acquired by the acquisition unit 103*b*.

Subsequently, in step S103 (estimation step), the learning unit 101*e* generates a plurality of estimated patches 13 (estimated images) by performing image processing of the divided second training patches 12 using the CNN 30 (machine learning model). The plurality of estimated patches 13 are estimated images obtained by the CNN 30, and ideally correspond to the plurality of respective second ground truth patches 14. By concatenating images including image capturing conditions of the respective pixels, in the channel direction of the plurality of second training patches 12, the learning unit 101*e* can input the image capturing conditions to the CNN 30. In a case where images including image capturing conditions of the respective pixels are input to the CNN 30 together with the second training patches 12, the learning unit 101*e* generates a plurality of estimated patches 13 by performing image processing that is based on the image capturing conditions, in addition to upscaling.

Subsequently, in step S104 (update step), the learning unit 101*e* updates a weight of the CNN 30 based on an error (Loss) between the estimated patches 13 and the second ground truth patches 14. The weight includes a filter and a bias of each layer. In the present exemplary embodiment, a backpropagation method is used for the weight update. However, the method is not limited to this.

In step S105, the learning unit 101*e* determines whether the learning of the weight has been completed. The completion can be determined based on whether the number of times learning (weight update) is repeated has reached a predetermined iteration number, or whether a weight change amount in update is smaller than a predetermined value (threshold). In a case where it is determined that the learning has not been completed (NO in step S105), the processing returns to step S101, in which a new first training patch 11 and a corresponding first ground truth patch 10 are acquired. In contrast, in a case where it is determined that the learning has been completed (YES in step S105), the learning apparatus 101 ends learning, and stores information regarding the weight, into the storage unit 101*a*.

Output image generation processing according to the present exemplary embodiment will now be described with reference to FIGS. 5 and 6.

Figure 5:
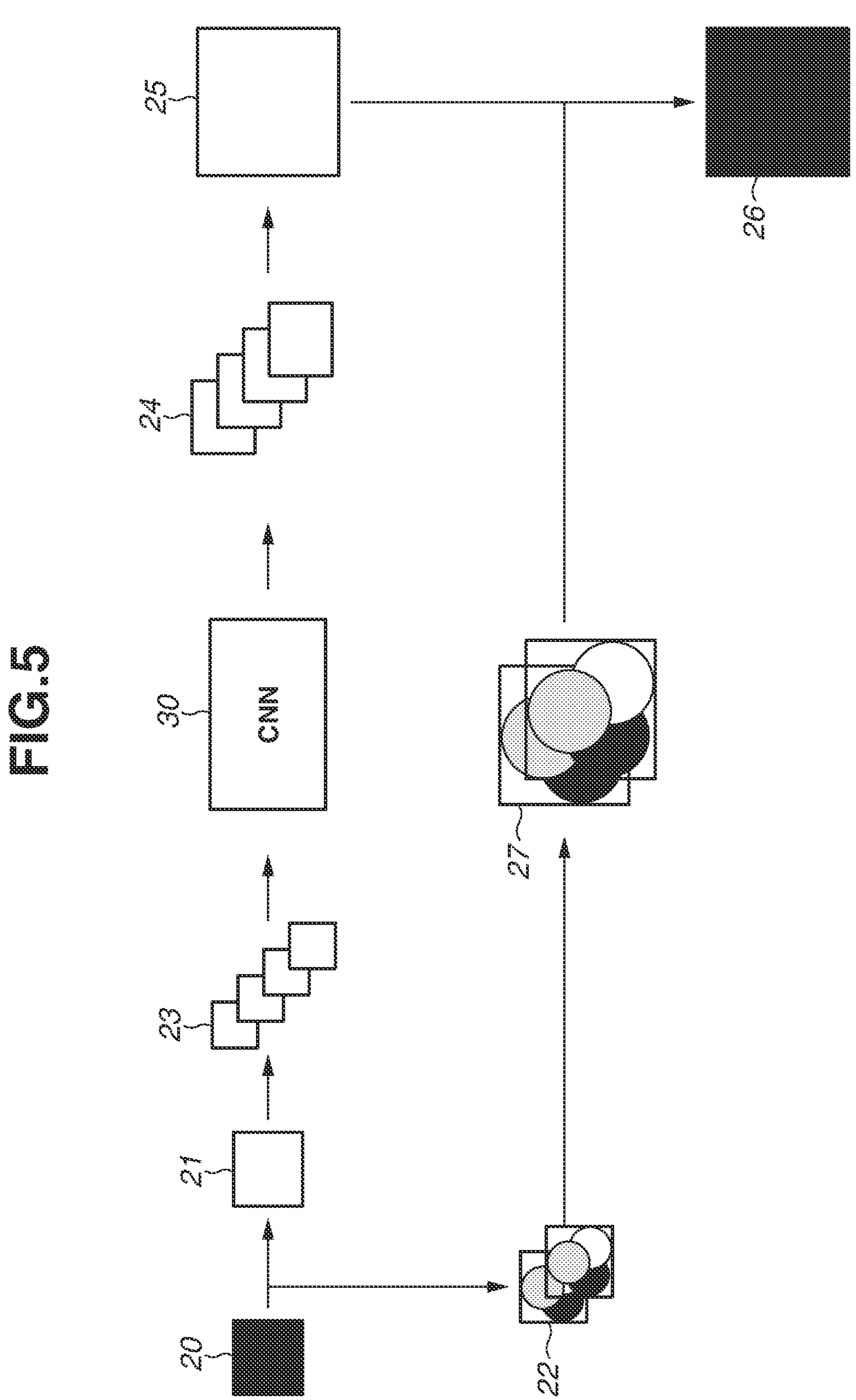
FIG. 5 is a conceptual diagram illustrating an output image generation method that uses a neural network according to the first exemplary embodiment.
Figure 6:
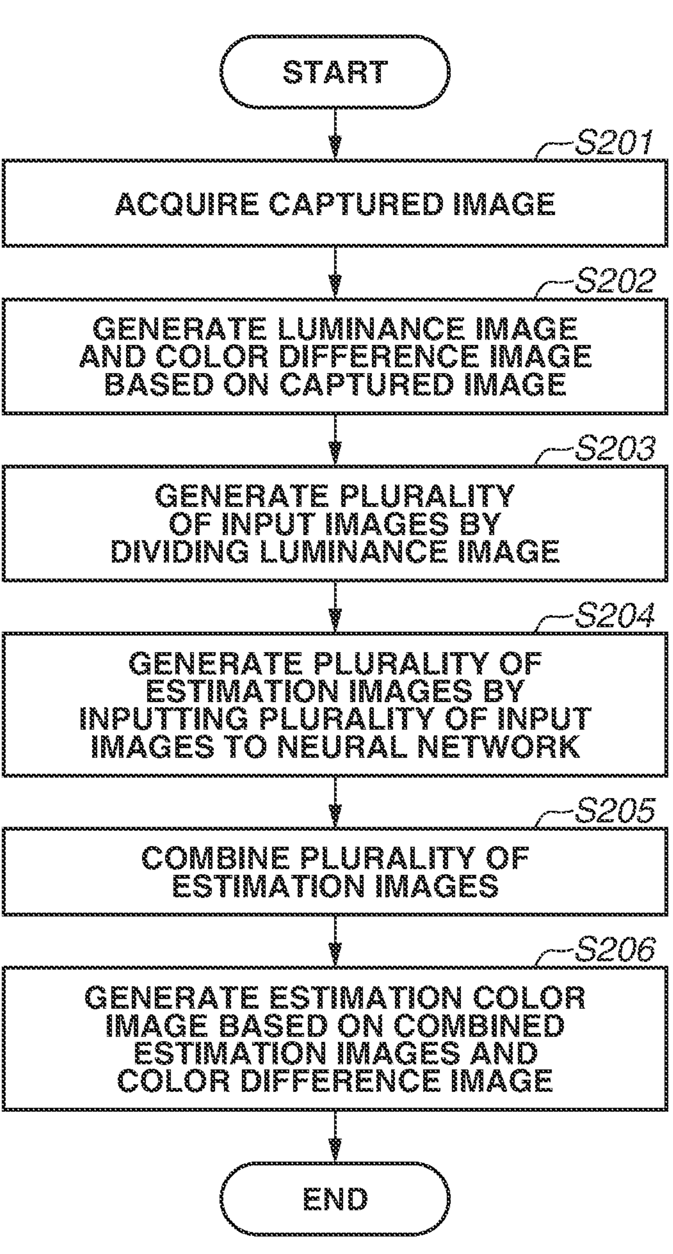
FIG. 6 is a flowchart illustrating output image generation processing that uses a neural network according to the first exemplary embodiment.

FIG. 5 is a conceptual diagram illustrating output image generation of a neural network. FIG. 6 is a flowchart illustrating output image generation processing that uses a neural network. Each step in FIG. 6 is mainly executed by the acquisition unit 103*b*, the generation unit 103*c*, the dividing unit 103*d*, and the processing unit 103*e* of the image estimation apparatus (image processing apparatus) 103.

In step S201 (acquisition step), the acquisition unit 103*b* acquires a captured image 20 (first color image). The captured image 20 is an image including at least luminance information similarly to images in learning. In the present exemplary embodiment, the captured image 20 is a color image transmitted from the imaging apparatus 102, however, the present invention is not limited to this. For example, the captured image 20 can be an image stored in the storage unit 103*a*. Furthermore, the captured image 20 can be a grayscale image in which only luminance information is represented only by single-color shading. An image capturing condition corresponding to the captured image 20 can be acquired together with the captured image 20, and used in the following process.

In step S202 (generation step), the generation unit 103*c* extracts a Y image (luminance image) and a plurality of chrominance images (first chrominance images) by performing YUV conversion of the acquired captured image 20. The luminance image is a first grayscale image 21 in which only luminance information of the captured image 20 is represented only by single-color shading. The plurality of chrominance images are a plurality of chrominance images 22 (first chrominance images) including information regarding a chrominance of the captured image 20. The Y image and the plurality of chrominance images can be generated from the captured image 20 in accordance with formulas (1).

In step S203 (division step), the dividing unit 103*d* generates a plurality of second grayscale images 23 by dividing the first grayscale image 21.

At this time, the plurality of second grayscale images 23 is generated by reversible division in which information is not lost by division. Thus, each of the second grayscale images 23 has longitudinal and traverse sizes at least one of which is smaller, and has a lower resolution as compared with those of the first grayscale image 21. Furthermore, because the second grayscale images 23 are reversibly transformed, the sum of the numbers of pixels of the second grayscale images 23 is equal to the number of pixels of the first grayscale image 21. It is desirable that the plurality of second grayscale images 23 includes the same number of pixels (resolution). In a case where the plurality of second grayscale images 23 includes the same number of pixels (resolution), calculation amounts for the plurality of second grayscale images 23 become the same. It is therefore possible to streamline calculation in an estimation step to be described below. Because the division method of the first grayscale image 21 is similar to the transformation method of the first training patch 11 in step S102, the description will be omitted.

In step S204 (estimation step), the processing unit 103*e* generates a plurality of first estimated images 24 (third grayscale images) from the plurality of second grayscale images 23 by performing image processing using the CNN 30. Weight information used in the generation of the plurality of first estimated images 24 is weight information transmitted from the learning apparatus 101 and stored in the storage unit 103*a*, and is weight information of a neural network similar to that in FIG. 3.

In step S205 (combining step), the processing unit 103*e* can further perform image processing on the plurality of first estimated images 24 as necessary. For example, a second estimated image 25 (fourth grayscale image) can be generated by combining (synthesizing) the plurality of first estimated images 24. At this time, the second estimated image 25 is generated from the plurality of first estimated images 24 by performing a reverse operation of the method of transforming the first grayscale image 21 into the plurality of second grayscale images 23 in step S203. That is, in the present exemplary embodiment, the processing unit 103*e* can generate the second estimated image 25 by combining the plurality of first estimated images 24 in the space directions. At this time, the number of pixels of the second estimated image 25 is equal to the sum of the numbers of pixels of the plurality of first estimated images 24. Accordingly, in the case of upscaling a magnification ratio to the same magnification ratio, a calculation amount can be reduced as compared with a case where a color image is used as an input image, by using the plurality of second grayscale images 23 obtained by down-sizing the first grayscale image 21, as input images to a machine learning model. The second estimated image 25 obtained by combining the plurality of first estimated images 24 is generated, and the image estimation apparatus 103 can also use the second estimated image 25 as an output image.

Furthermore, in step S206 (coloring step), the processing unit 103*e* can perform image processing of coloring the second estimated image 25. At this time, the processing unit 103*e* generates an estimated color image 26 (second color image) by performing coloring based on the second estimated image 25 and the plurality of chrominance images 22 generated in step S202. The estimated color image 26 is an image obtained by upscaling the captured image 20. In the present exemplary embodiment, the coloring of a luminance image is performed in accordance with formulas (2).

$$R=Y+1.13983V$$

$$G=Y-0.39465U-0.58060V$$

$$B=Y+2.03211U \quad (2)$$

Formulas (2) are formulas to be used in conversion from a YUV color space into an RGB color space. Formulas (2) represent a reverse operation of conversion from an RGB color space into a YUV color space that is performed in accordance with formulas (1). In a case where other definitional formulas are used as a generation method of a luminance image from a color image, a reverse operation thereof needs to be used as a generation method of a color image from a luminance image. In a case where the estimated color image 26 obtained by coloring the second estimated image 25 is generated, the image estimation apparatus 103 can use the estimated color image 26 as an output image.

Furthermore, to generate the estimated color image 26, the processing unit 103*e* can use a plurality of interpolated chrominance images 27 (second chrominance images). To achieve higher resolution, the plurality of interpolated chrominance images 27 is generated by interpolating each of the chrominance images 22 (interpolation step). The method of generating the interpolated chrominance images 27 from the chrominance images 22 is not limited to this. For example, the generation can be performed using a bilinear interpolation method and a bicubic interpolation method, or a method that uses a machine learning model. At this time, it is desirable that each of the plurality of interpolated chrominance images 27 has the same resolution (the number of pixels) as the second estimated image 25. By coloring the second estimated image 25 using the plurality of interpolated chrominance images 27 having the same resolution as the second estimated image 25, it is possible to reduce noise attributed to coloring, and obtain a more accurate estimated color image 26.

In the present exemplary embodiment, the description has been given of the method of acquiring the captured image 20 in step S201, generating the first grayscale image 21 from the captured image 20 in step S202, and generating an output image in step S203 and subsequent steps. Nevertheless, in a case where the acquisition unit 103*b* acquires, in step S201, an image (e.g., infrared image or depth map) originally represented in the grayscale, it is sufficient to execute the processing in step S203 and subsequent steps without executing the processing in steps S201 and S202. In this case, because information regarding a chrominance of the captured image 20 is not obtained, the second estimated image 25 cannot be colored.

In the present exemplary embodiment, the description has been given of an example case where the learning apparatus 101 and the image estimation apparatus 103 are separate apparatuses. However, the present invention is not limited to this. The learning apparatus 101 and the image estimation apparatus 103 can be integrally formed. That is, learning processing and estimation processing can be performed in a single apparatus.

According to the present exemplary embodiment with the above-described configuration, it is possible to provide an image processing system that obtains a high-resolution output image by using a grayscale image down-sized by reversible division in image processing that uses a machine learning model, as an input image.

An image processing system 200 according to a second exemplary embodiment of the present invention will now be described. The image processing system 200 according to the present exemplary embodiment learns and executes image processing of upscaling an image using a machine learning model.

The image processing system 200 according to the present exemplary embodiment differs from that in the first exemplary embodiment in that an imaging apparatus 202 acquires a captured image 20 and performs image processing.

Figure 7:
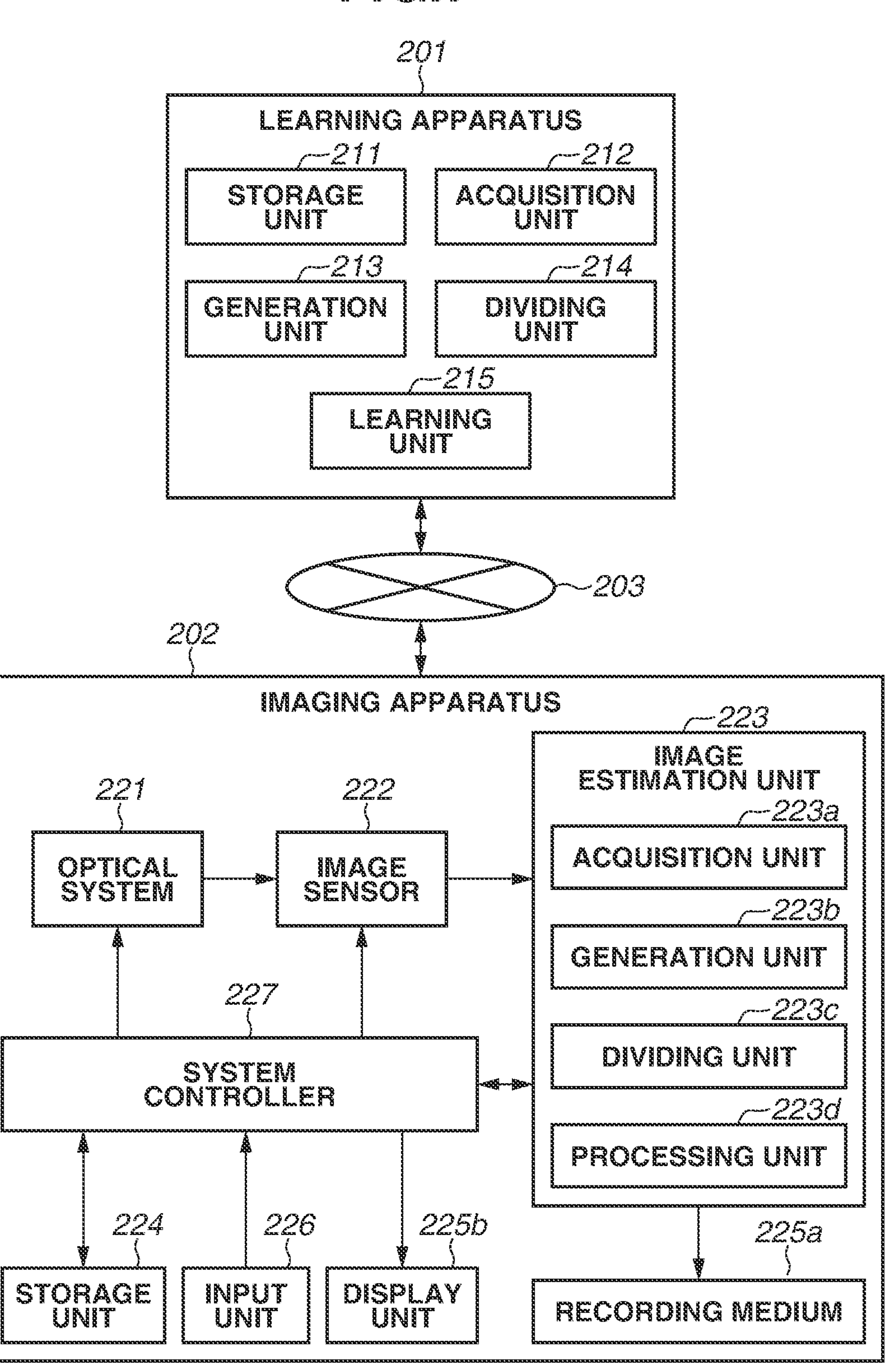
FIG. 7 is a block diagram of an image processing system according to a second exemplary embodiment.
Figure 8:
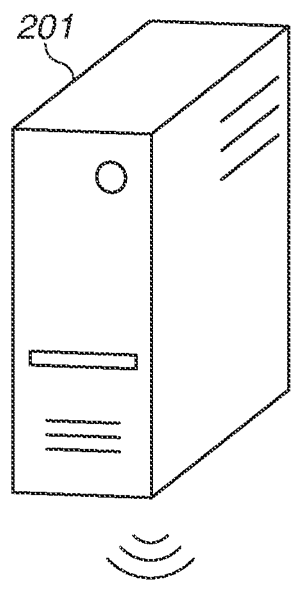
FIG. 8 is an appearance of the image processing system according to the second exemplary embodiment.
Figure 8:
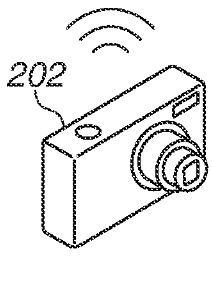

FIG. 7 is a block diagram of the image processing system 200 according to the present exemplary embodiment. FIG. 8 illustrates an appearance of the image processing system 200. The image processing system 200 includes a learning apparatus 201 and the imaging apparatus 202 that are connected via a network 203. The learning apparatus 201 and the imaging apparatus 202 need not be always connected via the network 203.

The learning apparatus 201 includes a storage unit (storage means) 211, an acquisition unit (acquisition means) 212, a generation unit (generation means) 213, a dividing unit (dividing means) 214, and a learning unit (learning means) 215. A weight of a neural network is learned (updated) using these units to upscale the captured image 20. Information regarding a weight of a neural network is preliminarily learned by the learning apparatus 201 and stored in the storage unit 211. Because a learning (update) method of a weight of a neural network that is to be executed in the learning apparatus 201 is similar to that in the first exemplary embodiment, the description will be omitted.

The imaging apparatus 202 includes an optical system 221, an image sensor 222, an image estimation unit 223, a storage unit 224, a recording medium 225*a*, a display unit 225*b*, an input unit 226, and a system controller 227. The imaging apparatus 202 generates an output image by capturing an image of a subject space and acquiring the captured image 20. The optical system 221 and the image sensor 222 in the imaging apparatus 202 are similar to those in the first exemplary embodiment, and thus the description will be omitted. The imaging apparatus 202 reads out information regarding a weight of a neural network from the storage unit 211 via the network 203, and stores the information into the storage unit 224.

The image estimation unit 223 includes an acquisition unit 223*a*, a generation unit 223*b*, a dividing unit 223*c*, and a processing unit 223*d*. The acquisition unit 223*a* acquires, from the imaging apparatus 202, the captured image 20 and an image capturing condition corresponding to the captured image 20. The generation unit 223*b* and the dividing unit 223*c* are similar to the generation unit 103*c* and the dividing unit 103*d*, respectively, in the first exemplary embodiment. An output image is generated by performing image processing of the captured image 20 acquired by the acquisition unit 223*a*, based on weight information of a neural network stored in the storage unit 224. In the present exemplary embodiment, the processing unit 223*d* uses an image capturing condition corresponding to the captured image 20, in image processing.

The output image is stored in the recording medium 225*a*. In a case where an estimated image display instruction is issued from the user via the input unit 226, the stored output image is read out and displayed on the display unit 225*b*. The image estimation unit 223 can perform processing of generating an output image by reading out the captured image 20 and the image capturing condition that are stored in the recording medium 225*a*. The system controller 227 controls processing to be performed in the imaging apparatus 202.

Figure 9:
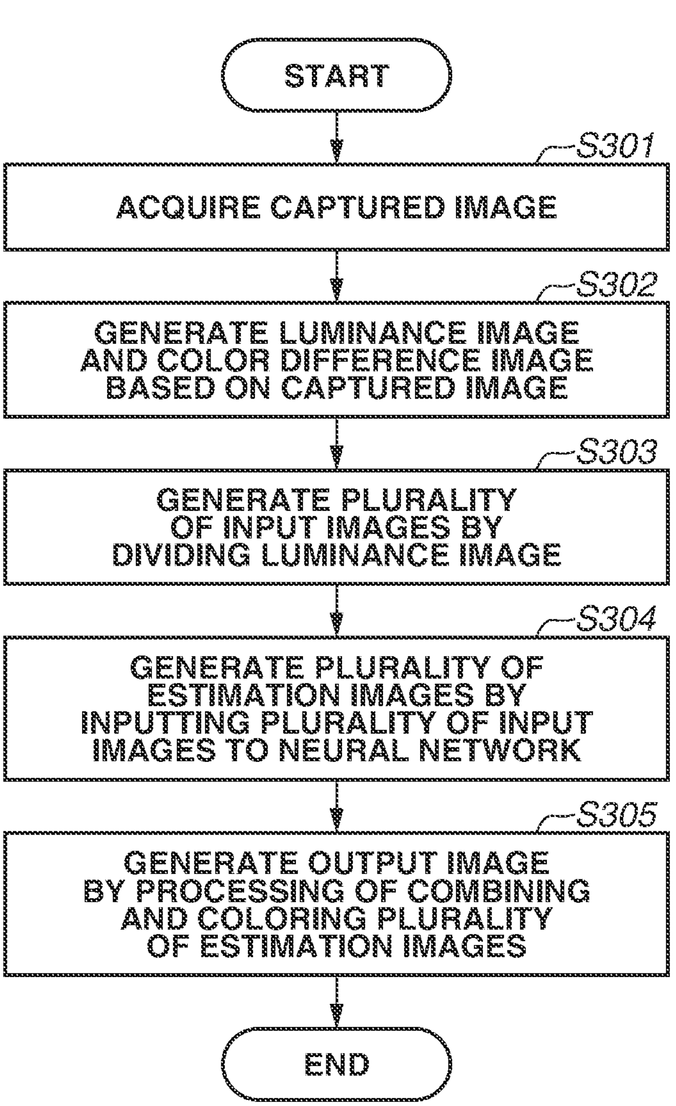
FIG. 9 is a flowchart illustrating output image generation processing that uses a neural network according to the second exemplary embodiment.

Output image generation according to the present exemplary embodiment will now be described. FIG. 9 is a flowchart illustrating output image generation processing that uses a neural network according to the present exemplary embodiment. Each step in the generation of a second estimated image 25 is mainly executed by the acquisition unit 223*a* (acquisition means), the generation unit (generation means) 223*b*, the dividing unit (dividing means) 223*c*, and the processing unit (estimation means) 223*d* of the image estimation unit 223.

In step S301 (acquisition step), the acquisition unit 223*a* acquires the captured image 20 and an image capturing condition corresponding to the captured image 20. In the present exemplary embodiment, the captured image 20 is a color image, and is an image acquired by the imaging apparatus 202 and stored in the storage unit 224. Steps S302 (generation step) and S303 (division step) are similar to steps S202 and S203 in the first exemplary embodiment, and thus the description will be omitted.

In step S304 (estimation step), the processing unit 223*d* generates a plurality of first estimated images (third grayscale images) 24 from a plurality of second grayscale images 23 by performing image processing using a neural network. Weight information of a neural network used in the generation of the first estimated images 24 is weight information transmitted from the learning apparatus 201 and stored in the storage unit 224, and is weight information in a neural network similar to that in FIG. 3. In the present exemplary embodiment, the processing unit 223*d* performs image processing using an ISO sensitivity as an image capturing condition in addition to the plurality of first estimated images 24. The ISO sensitivity is an image capturing condition indicating light sensitivity of a sensor. In a case where the ISO sensitivity is high, noise easily appears in an image. By using an ISO sensitivity as an image capturing condition, image processing can suppress excessive noise emphasis when a captured image 20 with high ISO sensitivity is upscaled.

The image capturing condition is not limited to an ISO sensitivity. For example, noise removal strength can also be used as an image capturing condition. In a case where noise removal strength of the captured image 20 is weak (the captured image 20 includes many high frequency components), image processing is performed in such a manner as to reduce high frequency components of an output image. In addition, sharpness strength can be used as an image capturing condition. In a case where sharpness strength of the captured image 20 is strong (the captured image 20 includes many high frequency components), image processing is performed in such a manner that high frequency components of an output image do not become excessive. Furthermore, an image compression rate can be used as an image capturing condition. In a case where an image compression rate of the captured image 20 is high (high frequency components of the captured image 20 are lost), image processing is performed in such a manner as to compensate for high frequency components of an output image.

Subsequently, in step S305 (processing step), the processing unit 223*d* generates an output image by combining and coloring the plurality of first estimated images 24. Because a combining method and a coloring method are similar to those in the first exemplary embodiment, the description will be omitted.

With the above-described configuration according to the present exemplary embodiment, it is possible to provide an image processing system that obtains a high-resolution output image by using a grayscale image down-sized by reversible transformation in image processing that uses a machine learning model, as an input image. In the present exemplary embodiment, it is possible to perform image processing more accurately by inputting an image capturing condition to a machine learning model together with a down-sized grayscale image.

An image processing system 300 according to a third exemplary embodiment of the present invention will now be described. The image processing system 300 according to the present exemplary embodiment causes a machine learning model to learn and execute image processing of upscaling an image.

The image processing system 300 according to the present exemplary embodiment differs from that in the first exemplary embodiment in that the image processing system 300 includes a control apparatus 304 that acquires a captured image 20 from an imaging apparatus 302, and issues (transmits) a request for image processing on the captured image 20 to an image estimation apparatus (image processing apparatus) 303.

Figure 10:
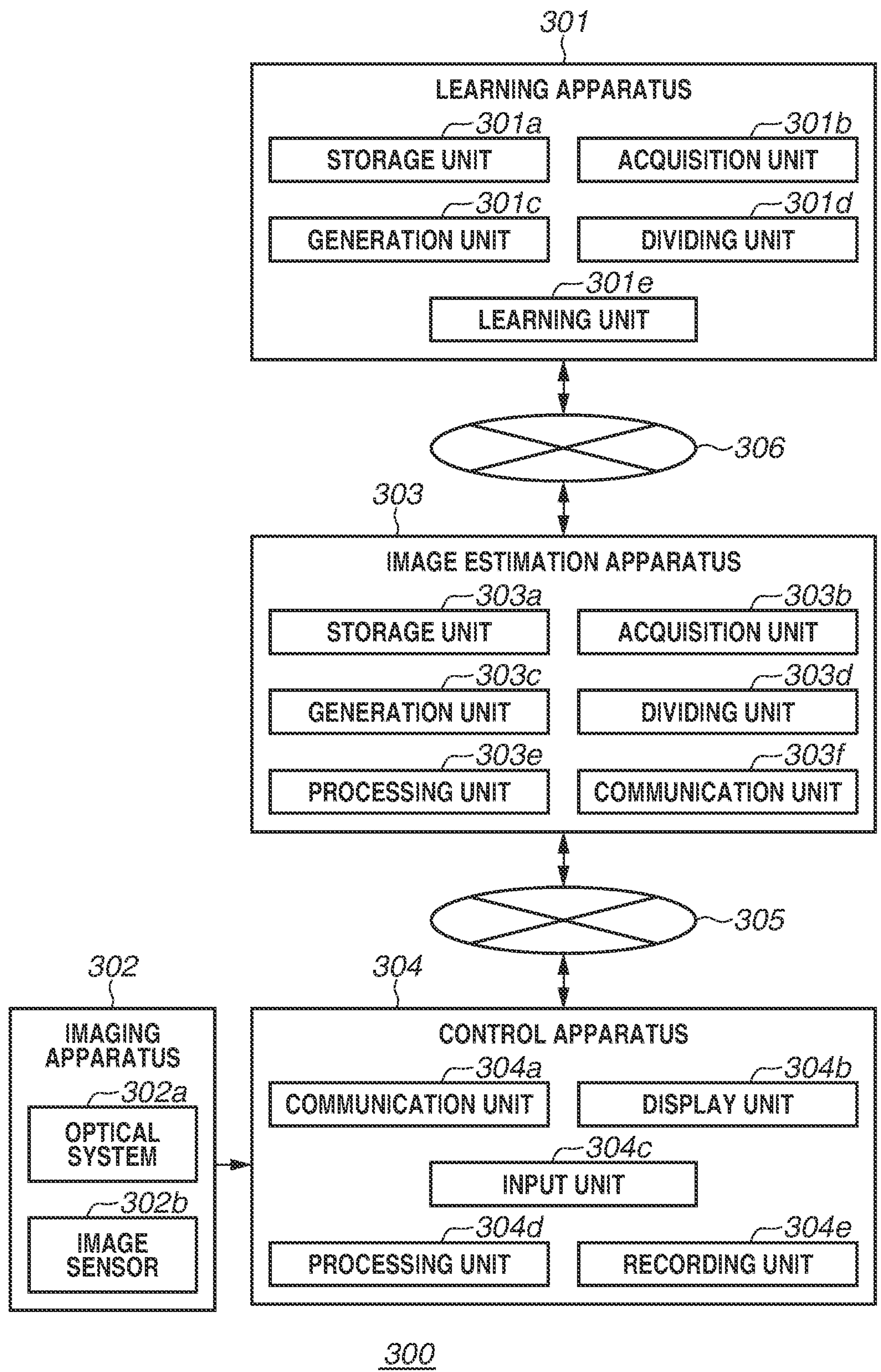
FIG. 10 is a block diagram of an image processing system according to a third exemplary embodiment.

FIG. 10 is a block diagram of the image processing system 300 according to the present exemplary embodiment. The image processing system 300 includes a learning apparatus 301, the imaging apparatus 302, the image estimation apparatus 303, and the control apparatus 304. In the present exemplary embodiment, the learning apparatus 301 and the image estimation apparatus 303 can be servers. The control apparatus 304 is a user terminal, such as a personal computer or a smartphone. The control apparatus 304 is connected to the image estimation apparatus 303 via a network 305. The image estimation apparatus 303 is connected to the learning apparatus 301 via a network 306. That is, the control apparatus 304 and the image estimation apparatus 303, and the image estimation apparatus 303 and the learning apparatus 301 are connected in such a manner that communication can be performed with each other.

The learning apparatus 301 and the imaging apparatus 302 in the image processing system 300 have configurations similar to the learning apparatus 101 and the imaging apparatus 102, respectively, and thus the description will be omitted.

The image estimation apparatus 303 includes a storage unit 303*a*, an acquisition unit (acquisition means) 303*b*, a generation unit (generation means) 303*c*, a dividing unit (dividing means) 303*d*, a processing unit (estimation means) 303*e*, and a communication unit (receiving means) 303*f*. The storage unit 303*a*, the acquisition unit 303*b*, the generation unit 303*c*, the dividing unit 303*d*, and the processing unit 303*e* in the image estimation apparatus 303 are similar to the storage unit 103*a*, the acquisition unit 103*b*, the generation unit 103*c*, the dividing unit 103*d*, and the processing unit 103*e*, respectively.

The control apparatus 304 includes a communication unit (transmission means) 304*a*, a display unit (display means) 304*b*, an input unit (input means) 304*c*, a processing unit (processing means) 304*d*, and a recording unit 304*e*. The communication unit 304*a* can transmit a request for causing the image estimation apparatus 303 to execute processing on the captured image 20, to the image estimation apparatus 303. The communication unit 304*a* can also receive an output image processed by the image estimation apparatus 303. The communication unit 304*a* can communicate with the imaging apparatus 302. The display unit 304*b* displays various types of information. The various types of information to be displayed by the display unit 304*b* include, for example, the captured image 20 to be transmitted to the image estimation apparatus 303, or an output image received from the image estimation apparatus 303. The input unit 304*c* can input an instruction to start image processing, from the user. The processing unit 304*d* can perform image processing including coloring, on an output image received from the image estimation apparatus 303. The recording unit 304*e* stores the captured image 20 acquired from the imaging apparatus 302, and an output image received from the image estimation apparatus 303.

A method of transmitting the captured image 20 to be processed, to the image estimation apparatus 303 is not limited. For example, the captured image 20 can be uploaded to the image estimation apparatus 303 simultaneously with the processing in step S401, or can be uploaded to the image estimation apparatus 303 before the processing in step S401. The captured image 20 can be an image stored in a server different from the image estimation apparatus 303.

Figure 11:
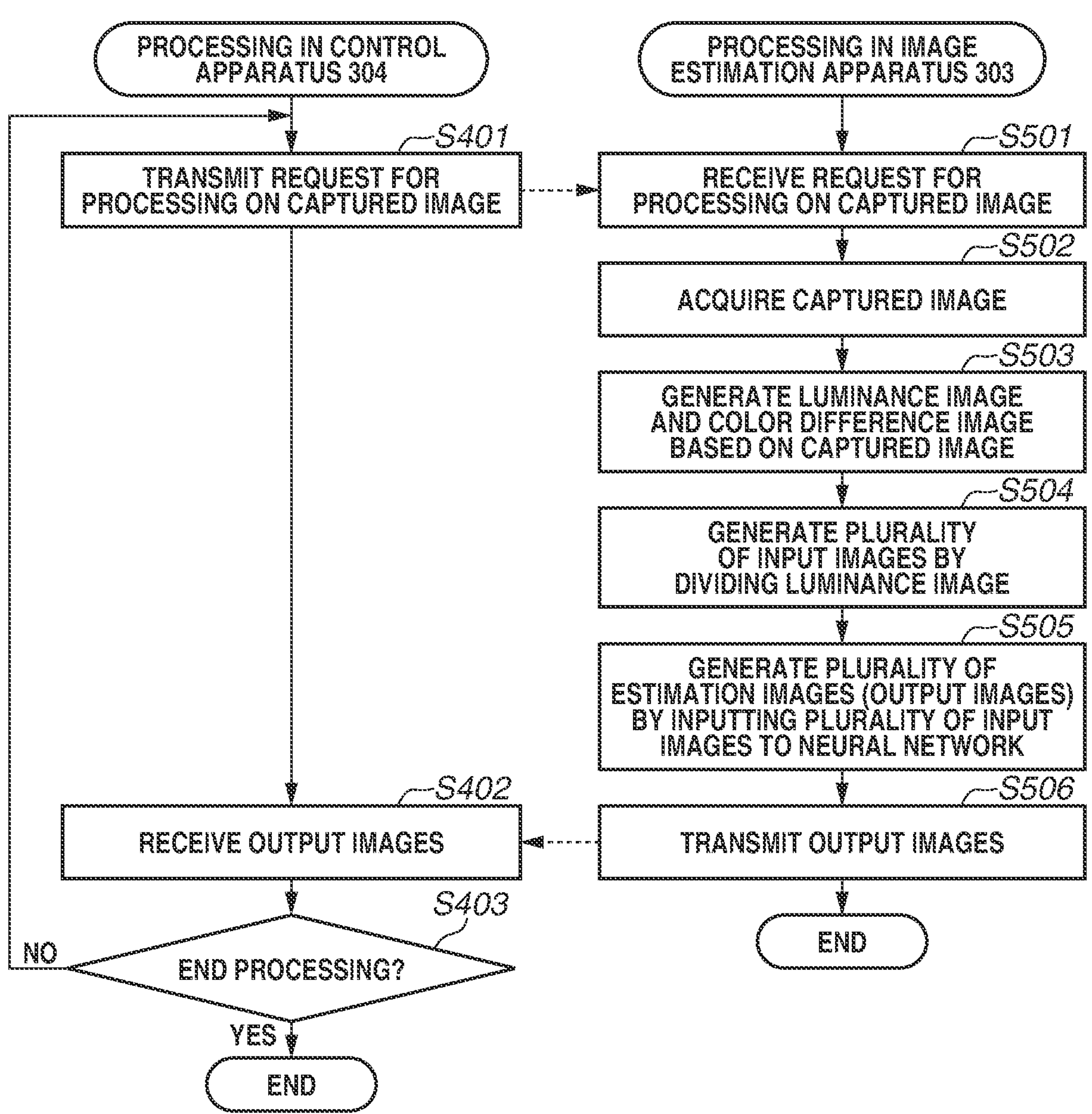
FIG. 11 is a flowchart illustrating output image generation processing that uses a neural network according to the third exemplary embodiment.

Output image generation according to the present exemplary embodiment will now be described. FIG. 11 is a flowchart illustrating output image generation processing that uses a neural network according to the present exemplary embodiment.

An operation of the control apparatus 304 will be described. Image processing in the present exemplary embodiment is started in accordance with an image processing start instruction issued by the user via the control apparatus 304.

In step S401 (first transmission step), the communication unit 304*a* transmits a request for processing on the captured image 20 to the image estimation apparatus 303. In step S401, the control apparatus 304 can transmit an ID for user authentication or an image capturing condition corresponding to the captured image 20, together with the request for processing on the captured image 20.

In step S402 (first receiving step), the communication unit 304*a* receives an output image generated by the image estimation apparatus 303.

An operation of the image estimation apparatus 303 will now be described. In step S501, the communication unit 303*f* receives the request for processing on the captured image 20 that has been transmitted from the communication unit 304*a*. The image estimation apparatus 303 executes the processing in step S502 and subsequent steps by receiving an instruction to execute processing on the captured image 20.

In step S502, the acquisition unit 303*b* acquires the captured image 20. In the present exemplary embodiment, the captured image 20 is an image transmitted from the control apparatus 304. At this time, the acquisition unit 303*b* can acquire an image capturing condition corresponding to the captured image 20, together with the captured image 20. The processing in step S501 and the processing in step S502 can be simultaneously executed. Because the processing in steps S503 to S505 is similar to the processing in steps S202 to S204, the description will be omitted.

In step S506, the image estimation apparatus 303 transmits an output image to the control apparatus 304. An output image to be transmitted by the image estimation apparatus 303 includes any of a plurality of first estimated images 24, a second estimated image 25 generated from the plurality of first estimated images 24, and an estimated color image 26.

With the above-described configuration according to the present exemplary embodiment, it is possible to provide an image processing system that obtains a high-resolution output image by using a grayscale image down-sized by reversible transformation in image processing that uses a machine learning model, as an input image. In the present exemplary embodiment, the control apparatus 304 merely issues a request for processing on a specific image. Actual image processing is performed by the image estimation apparatus 303. Thus, if a user terminal is used as the control apparatus 304, processing load on the user terminal can be reduced. It accordingly becomes possible for a user to obtain an output image with low processing load.

The present exemplary embodiment can also be implemented by processing of supplying a program for implementing one or more functions of the above-described exemplary embodiments, to a system or an apparatus via a network or a storage medium, and one or more processors in a computer of the system or the apparatus reading out and executing the program. The present exemplary embodiment can also be implemented by a circuit for implementing one or more functions (for example, an application specific integrated circuit (ASIC)).

According to each exemplary embodiment, it is possible to provide an image processing method, an image processing apparatus, a program, and a storage medium that can obtain a high-resolution output image in image processing that uses a machine learning model, as an input image. The image processing apparatus is only required to be an apparatus having an image processing function according to the present exemplary embodiment, and can be implemented in the form of an imaging apparatus or a personal computer.

Heretofore, the exemplary embodiments of the present invention have been described. However, the present invention is not limited to these exemplary embodiments. Various modifications and changes can be made without departing from the gist thereof.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-108573, filed Jul. 5, 2022, which is hereby incorporated by reference herein in its entirety.

What is claimed is:

1. An image processing method comprising:

generating a first grayscale image based on a first color image, the first color image being acquired by image capturing that uses an image sensor;

generating, by dividing the first grayscale image, a plurality of second grayscale images where each has less number of pixels than that of the first grayscale image;

generating a plurality of third grayscale images upscaled by inputting the plurality of second grayscale images and an ISO sensitivity of the image sensor in the image capturing to a machine learning model, wherein in the generating the plurality of third grayscale images, the plurality of second grayscale images and the ISO sensitivity are concatenated in a channel direction and inputted to the machine learning model; and generating a second color image based on the plurality of third grayscale images, wherein the second color image has more pixels than the first color image.

2. The image processing method according to claim 1, wherein a number of pixels of each of the plurality of second grayscale images are the same as each other.

3. The image processing method according to claim 1, further comprising generating a fourth grayscale image by combining the plurality of third grayscale images.

4. The image processing method according to claim 3, wherein a number of pixels of the fourth grayscale image and a sum of numbers of pixels of the plurality of third grayscale images are equal.

5. The image processing method according to claim 3, further comprising:

generating the first grayscale image and a plurality of first chrominance images from the first color image; and generating the second color image based on the fourth grayscale image and the plurality of first chrominance images.

6. The image processing method according to claim 5, further comprising generating a plurality of second chrominance images by upscaling the plurality of first chrominance images, wherein the second color image is generated based on the fourth grayscale image and the plurality of second chrominance images.

7. The image processing method according to claim 6, wherein a number of pixels of each of the plurality of second chrominance images is the same as the number of pixels of the fourth grayscale image.

8. The image processing method according to claim 5, wherein the first color image is acquired by image capturing using an optical system and the image sensor, and wherein the generating the plurality of third grayscale images generates the plurality of third grayscale images upscaled by inputting the plurality of second grayscale images and an image capturing condition in the image capturing to the machine learning model.

9. The image processing method according to claim 1, further comprising inputting an image capturing condition including at least one of a pixel pitch of the image sensor or a type of an optical low-pass filter of the optical system to the machine learning model.

10. The image processing method according to claim 8, wherein the image capturing condition includes at least one of noise removal strength, sharpness strength, or an image compression rate.

11. A non-transitory computer-readable storage medium storing a program for causing a computer to execute the image processing method according to claim 1.

12. An image processing apparatus comprising:

at least one memory storing instructions; and at least one processor that executes the instructions to:

generate a first grayscale image based on a first color image, the first color image being acquired by image capturing that uses an image sensor;

generate, by dividing the first grayscale image, a plurality of second grayscale images each including a number of pixels smaller than a number of pixels of the first grayscale image;

generate a plurality of third grayscale images upscaled by inputting the plurality of second grayscale images and an ISO sensitivity of the image sensor in the image capturing to a machine learning model, wherein in the generating the plurality of third grayscale images, the plurality of second grayscale images and the ISO sensitivity are concatenated in a channel direction and inputted to the machine learning model; and generate a second color image based on the plurality of third grayscale images, wherein the second color image has more pixels than the first color image.

13. A learning apparatus comprising:

at least one memory storing instructions; and at least one processor that executes the instructions to:

acquire a first training image and a first ground truth image;

generate, by dividing the first training image and the first ground truth image, a plurality of second training images each including a number of pixels smaller than a number of pixels of the first training image, and a plurality of second ground truth images each including a number of pixels smaller than a number of pixels of the first ground truth image;

generate a plurality of estimated images upscaled by inputting the plurality of second training images to a machine learning model; and update a weight of a neural network based on the plurality of estimated images and the plurality of second ground truth images;

generate a first grayscale image based on a first color image, the first color image being acquired by image capturing that uses an image sensor;

generate, by dividing the first grayscale image, a plurality of second grayscale images each including a number of pixels smaller than a number of pixels of the first grayscale image;

generate a plurality of third grayscale images upscaled by inputting the plurality of second grayscale images and an ISO sensitivity of the image sensor in the image capturing to the machine learning model, wherein in the generating the plurality of third grayscale images, the plurality of second grayscale images and the ISO sensitivity are concatenated in a channel direction and inputted to the machine learning model; and generate a second color image based on the plurality of third grayscale images, wherein the second color image has more pixels than the first color image.

14. A manufacturing method of a learned model, the manufacturing method comprising:

acquiring a first training image and a first ground truth image;

generating, by dividing the first training image and the first ground truth image, a plurality of second training images where each has less number of pixels than that of the first training image, and a plurality of second ground truth images where each has less number of pixels than that of the first ground truth image;

generating a plurality of estimated images upscaled by inputting the plurality of second training images to a machine learning model;

updating a weight of a neural network based on the plurality of estimated images and the plurality of second ground truth images;

generating a first grayscale image based on a first color image, the first color image being acquired by image capturing that uses an image sensor;

generating, by dividing the first grayscale image, a plurality of second grayscale images each including a number of pixels smaller than a number of pixels of the first grayscale image;

generating a plurality of third grayscale images upscaled by inputting the plurality of second grayscale images and an ISO sensitivity of the image sensor in the image capturing to the machine learning model, wherein in the generating the plurality of third grayscale images, the plurality of second grayscale images and the ISO sensitivity are concatenated in a channel direction and inputted to the machine learning model; and generating a second color image based on the plurality of third grayscale images, wherein the second color image has more pixels than the first color image.

15. A non-transitory computer-readable storage medium storing a program for causing a computer to execute the manufacturing method of a learned model according to claim 14.

16. An image processing system including an imaging apparatus and a learning apparatus configured to communicate with the imaging apparatus, wherein the learning apparatus includes at least one memory storing instructions; and at least one processor that executes the instructions to:

acquire a first training image and a first ground truth image, generate, by dividing the first training image and the first ground truth image, a plurality of second training images where each has less number of pixels than that of the first training image, and a plurality of second ground truth images where each has less number of pixels than that of the first ground truth image;

generate a plurality of estimated images upscaled by inputting the plurality of second training images to a machine learning model, and update a weight of a neural network based on the plurality of estimated images and the plurality of second ground truth images, wherein the imaging apparatus includes an optical system, an image sensor, and an image estimation unit, and wherein the image estimation unit includes at least one memory storing instructions; and at least one processor that executes the instructions to:

acquire a first grayscale image based on a first color image, the first color image being acquired by image capturing that uses an image sensor, generate, by dividing the first grayscale image, a plurality of second grayscale images each including a number of pixels smaller than a number of pixels of the first grayscale image, generate a plurality of third grayscale images upscaled by inputting the plurality of second grayscale images and an ISO sensitivity of the image sensor in the image capturing to the machine learning model, wherein in the generating the plurality of third grayscale images, the plurality of second grayscale images and the ISO sensitivity are concatenated in a channel direction and inputted to the machine learning model; and generate a second color image based on the plurality of third grayscale images, wherein the second color image has more pixels than the first color image.

17. An image processing system including a control apparatus and an image processing apparatus configured to communicate with the control apparatus, wherein the control apparatus includes a unit configured to transmit a request for causing the image processing apparatus to execute processing on a captured image, and wherein the image processing apparatus includes at least one memory storing instructions; and at least one processor that executes the instructions to:

receive the request, acquire the captured image, wherein the captured image is a first color image acquired by image capturing using an image sensor, generate a first grayscale image based on the first color image, generate, by dividing the first grayscale image, a plurality of second grayscale images each including a number of pixels smaller than a number of pixels of the first grayscale image, generate a plurality of third grayscale images upscaled by inputting the plurality of second grayscale images and an ISO sensitivity of the image sensor in the image capturing to a machine learning model, wherein in the generating the plurality of third grayscale images, the plurality of second grayscale images and the ISO sensitivity are concatenated in a channel direction and inputted to the machine learning model; and generating a second color image based on the plurality of third grayscale images, wherein the second color image has more pixels than the first color image.

* * * * *